United States Patent
Schneeberger et al.

(10) Patent No.: US 6,352,366 B1
(45) Date of Patent: Mar. 5, 2002

(54) LINEAR GUIDE FOR ROLLER BEARINGS

(75) Inventors: Hans-Martin Schneeberger, Langenthal; Georg Michaelsen, Roggwil, both of (CH)

(73) Assignee: Schneeberger Holding AG, Roggwil (CH)

( * ) Notice: Subject to any disclaimer, the term of this patent is extended or adjusted under 35 U.S.C. 154(b) by 0 days.

(21) Appl. No.: 09/487,590

(22) Filed: Jan. 19, 2000

(30) Foreign Application Priority Data

Jan. 19, 1999 (CH) .............................................. 0094/99
May 6, 1999 (CH) .............................................. 0853/99

(51) Int. Cl.[7] .............................................. F16C 29/06
(52) U.S. Cl. .......................................... 384/45; 384/13
(58) Field of Search .............................. 384/43, 44, 45, 384/13, 907, 911, 908, 909

(56) References Cited

U.S. PATENT DOCUMENTS

| | | | |
|---|---|---|---|
| 4,421,363 A | * 12/1983 | Olschewski et al. | 384/43 |
| 5,076,713 A | 12/1991 | Morita | 384/45 |
| 5,615,955 A | * 4/1997 | Namimatsu et al. | 384/13 |
| 5,755,516 A | * 5/1998 | Teramachi et al. | 384/45 |
| 5,829,883 A | * 11/1998 | Kawaguchi et al. | 384/45 |
| 5,980,111 A | * 11/1999 | Sasaki | 384/45 |
| 6,042,269 A | * 3/2000 | Konomoto | 384/45 |
| 6,045,265 A | * 4/2000 | Shirai et al. | 384/45 |
| 6,126,319 A | * 10/2000 | Toyota et al. | 384/43 |

FOREIGN PATENT DOCUMENTS

| | | |
|---|---|---|
| EP | 0 296 291 | 12/1988 |
| EP | 0 794 343 | 9/1997 |
| FR | 2 755 733 | 5/1998 |
| JP | 05332356 | 12/1993 |
| JP | 08061364 | 3/1996 |
| JP | 08240223 | 9/1996 |
| WO | 94/15109 | 7/1994 |
| WO | 98/21494 | 5/1998 |

* cited by examiner

*Primary Examiner*—Thomas R. Hannon
(74) *Attorney, Agent, or Firm*—Venable; Gabor J. Kelemen

(57) ABSTRACT

A guide member for a linear movement guide, which guide member is arranged on and can execute movements in longitudinal direction along a rail (1). Guide members (2) of this type are provided with at least one roll body circuit (6a–6d), wherein each roll body circuit comprises a return channel, a bearing zone (11), as well as two deflection channels (13) that connect the return channel (12) and the bearing zone (11). Each roll body circuit contains several roll bodies (7), wherein guide means are provided for guiding the roll bodies inside the roll body circuit. A roll body circuit of this type is intended to dispense with the feeding of lubricants. For this, the invention suggests that at least some of the guide means, at least in the region of the running surfaces for the roll bodies, be provided with a plastic material having at least two components. The first component is embedded in the form of particles in the second component. The first component has a lower friction coefficient than the second component, relative to a metal or ceramic friction partner, and the respective guide means are created by spraying on the plastic material with the aid of an injection-molding technique, at least in the region of the running surfaces.

24 Claims, 3 Drawing Sheets

LINEAR GUIDE FOR ROLLER BEARINGS

Figure 1:
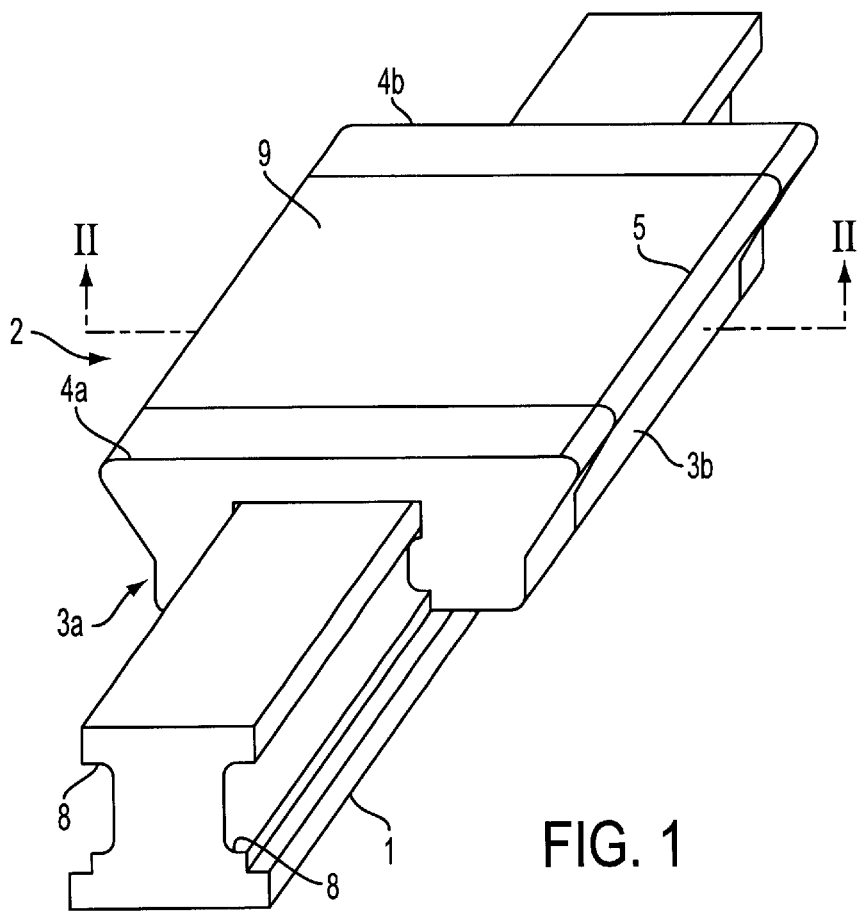

The invention relates to a guide member for a linear-movement guide, arranged on and executing movements in longitudinal direction along a rail, which guide member comprises at least one roll body circuit, wherein each roll body circuit has a return channel, a bearing zone, as well as two deflection channels that connect the return channel and the bearing zone, which further comprises several roll bodies in each roll body circuit and is provided with guide means for guiding the roll bodies inside the roll body circuit.

Linear guides for roller bearings are used in many areas of technology, in which one structural component is to be moved in a straight line and without frictional losses, if possible, relative to another structural component. Machine tools represent one example for this. A carriage or slide serves as guide member for such guides and is guided along a rail over roll bodies such as balls, rollers or needles. The roll bodies in that case circulate in closed roll body circuits of the carriage. Normally they have a bearing zone, in which the roll bodies fit flush against a bearing surface of the carriage and against the rail, thereby supporting the load to be moved. Owing to the linear movement of the carriage, the roll bodies move from the bearing zone into a first deflection channel, in which the roll bodies are transferred from the bearing zone to the return channel. Following passage through the return channel, the roll bodies travel via a second deflection channel back to the bearing zone.

Using plastic components for the carriage surfaces, which come in contact with the roll bodies, has long been known as a way to minimize wear on the roll bodies and improving the quietness of running of a linear guide. German Patent 35 40 099, for example, discloses providing the guide surfaces of the return channel as separately produced sleeves, which are inserted later on into corresponding recesses in the metal base body of the carriage. With this type of design, it can be considered a disadvantage that an accurate production and extremely exact and involved assembly are required. Additional transition points also develop on this two-part sleeve design, which can reduce the quietness of running.

German Patent 43 31 014 C2 furthermore describes producing guide means in the bearing zones and the return channels by spraying the plastic guide surfaces directly onto the metal base body of the carriage with the aid of an injection-molding technique. However, this known carriage also requires a relatively involved lubricant supply, as does the previously mentioned carriage. For the lubricant supply, lubricant is fed from the outside to the inside of the carriage in order to lubricate the roll bodies normally made of metal. This is designed to reduce wear on the roll bodies and thus extend the service life of the guide. The known lubricant-supply methods, however, increase the design expenditure and thus make the linear guide more expensive. Also, it is not possible to rule out a defect in the lubricant supply, which can lead to considerable damage to the machine in which the linear guide is used.

Thus, it is the object of the invention to create a carriage with which the above-described disadvantages in prior art can be avoided. In particular, the goal is to create a carriage, which makes it possible, at least for the most part, to dispense with a lubricant supply or lubricant feeding of the known type.

With a guide member of the aforementioned type, this object is solved in that at least a portion of the material for forming the guide means contains or is bonded to a material, which reduces the wear on the linear guide, particularly the wear on the roll bodies. Guides according to the invention thus can contain a multi-component material, to which the wear-reducing material is bonded similar to a matrix. The resulting material is heterogeneous and, with respect to its structure, can be compared to standard composites. In contrast to these standard composites, a component of the "composites" according to the invention is designed to reduce friction with the roll bodies and does not function, at least not primarily, to increase the material strength.

It has turned out that this material can be processed particularly well if it contains a thermoplastic plastic with an added solid lubricant, which must be processed with an injection-molding technique. The guide member can be produced with very little expenditure if complete components of the guide member are fashioned from the one material only and with the injection-molding technique. The solid lubricant in this case can be formulated in different ways. However, it has proven advantageous if the solid lubricant is added in the form of fibers. With this preferred embodiment, the fibers should permit the dry run, meaning the circulation without lubricant, of the roll bodies.

In practical tests, using fibers made of PTFE (poly tetrafluoroethylene), so-called Teflon® (commercially used mark and registered trademark of the DuPont Company) has proven advantageous because it leads to particularly low wear of the roll bodies. To be sure, Teflon is known to be particularly susceptible to wear at high surface pressure and the wear-resistance required in roller bearings for linear guides is particularly high. Nevertheless, it has turned out surprisingly that comparably high service life times for linear-movement guides can be reached if PTFE particles are added to a thermoplastic plastic suitable for the injection-molding technique, e.g. POM plastics belonging to the group of poly acetals (poly oxymethylene). Alternative to PTFE, poly fluoroethylene propylene or perfluoroalkoxy can also be used.

Furthermore, it has proven advantageous if the particles are present in the form of fibers, having a length between 100 $\mu$m and 700 $\mu$m, preferably between 170 $\mu$m and 500 $\mu$m and having a width between 10 $\mu$m and 100 $\mu$m, preferably between 20 $\mu$m and 40 $\mu$m. At least in the surface region of the guide means, the particles should account for a volume share of 5% to 35%, preferably 12% to 15%, measured on the total material volume. Of course, the particles can also be present in formulations other than fibers and in dimensions and amounts other than those mentioned in the above. For example, the particles can also be present in the form of balls.

With respect to the service life of linear guides, particularly lubricant-free linear guides, especially good results can be achieved if a ceramic material is used for at least some of the roll bodies, e.g. $Si_3N_4$, $ZrO_2$ or $Al_2O_3$. In this connection, the applicant has filed in 1998 the Swiss Patent Application 1388/98. A particularly favorable combination is given with the use of such roll bodies, together with the previously mentioned use of fibers or particles made of PTFE in a plastic for the guide means.

Of course, it is also possible to use materials other than PTFE, which are added to the material for the guide means. For this, all dry lubricants can be used in principle, e.g. sulfide-bonding halides or perfluorinated plastics. Particularly suitable are materials that result in the highest possible reduction in the frictional coefficient between roll bodies and the respective guide means with the lowest possible abrasive wear of the solid particles. $MoS_2$ is also a suitable material for this, in addition to PTFE.

Finally, the wear-reducing materials can also be present in the form of a coating that is deposited on a guide means.

In that case, the wear-reducing materials are present only at the guide surfaces or running surfaces of the guide means or the rail or are additionally deposited on the previously described guide means. A coating of this type can be applied, for example, by spraying it on with one or several nozzles, by submerging the guide means or the rail in a bath, or by using galvanic processes. Coatings of this type can contain, for example, poly tetrafluoroethylene, poly tetrafluoroethylene propylene, perfluoroalkoxy, diamond-like amorphous carbon, chromium and/or $MoS_2$.

Basically it is not necessary for all guide means of a roll body circuit to be provided with a material according to the invention. It has turned out to be sufficient if at least some of the guide means are provided with it. Thus, it makes sense if at least the guide means of the deflection channels are designed in this way, which already results in the advantage of the friction being reduced at the locations with the highest load. In addition, a solution that is favorable with respect to production technology can be achieved.

Additional preferred embodiments of the invention result from the dependent claims.

Figure 2:
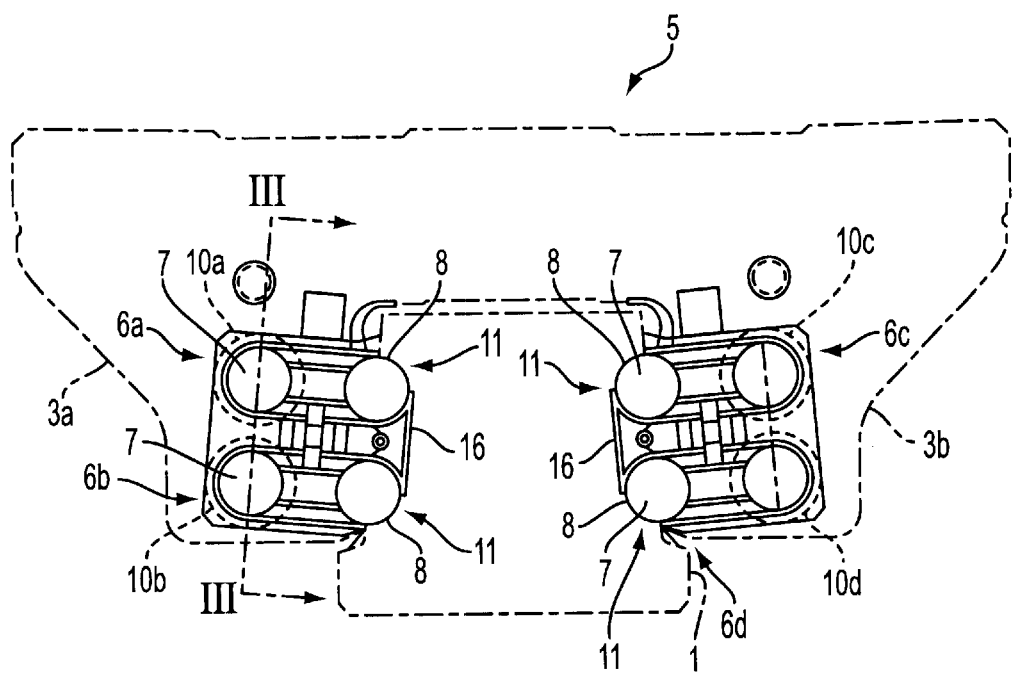
Figure 3:
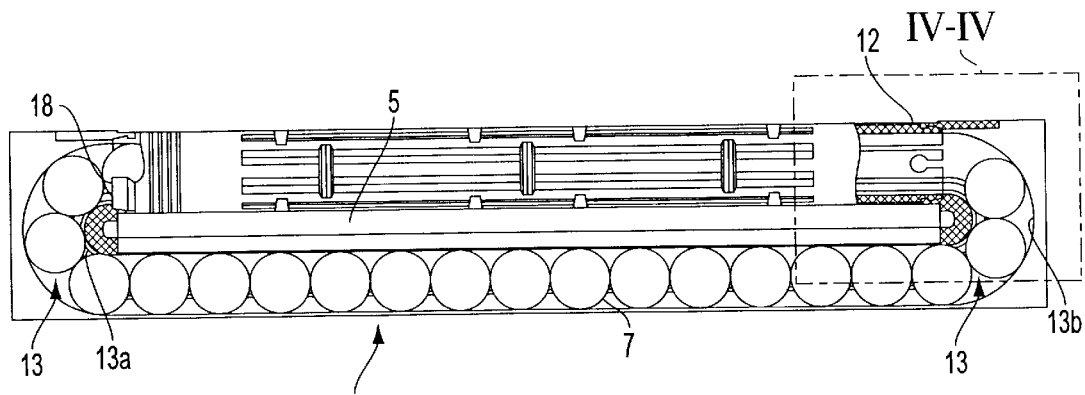
Figure 4:
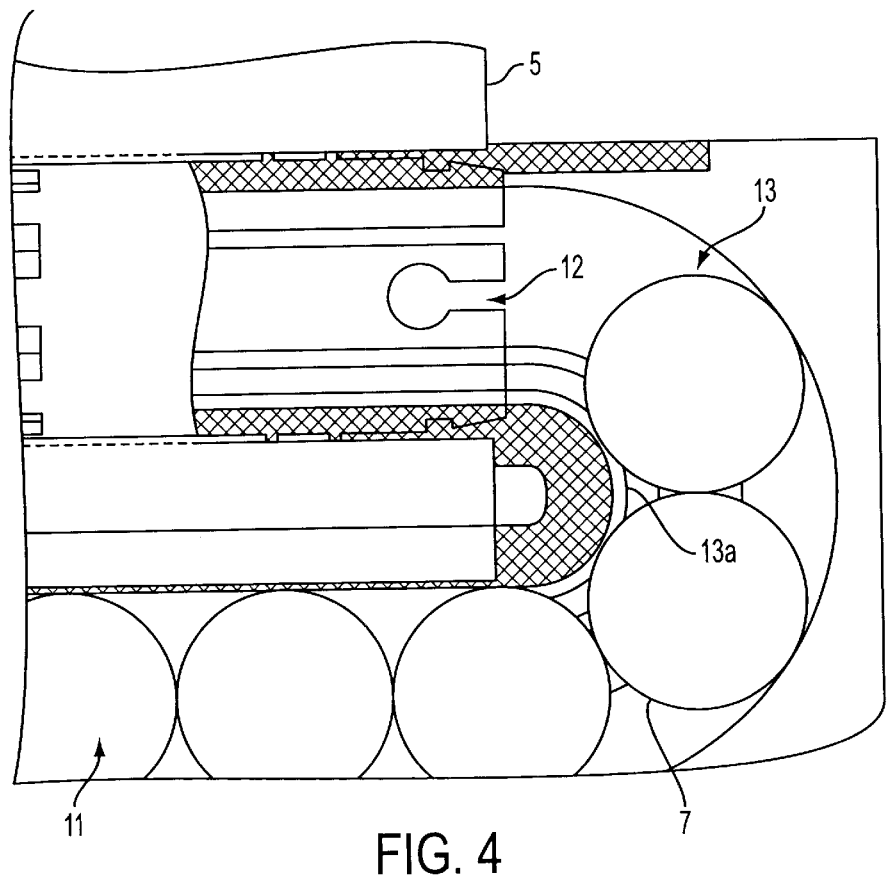
Figure 5:
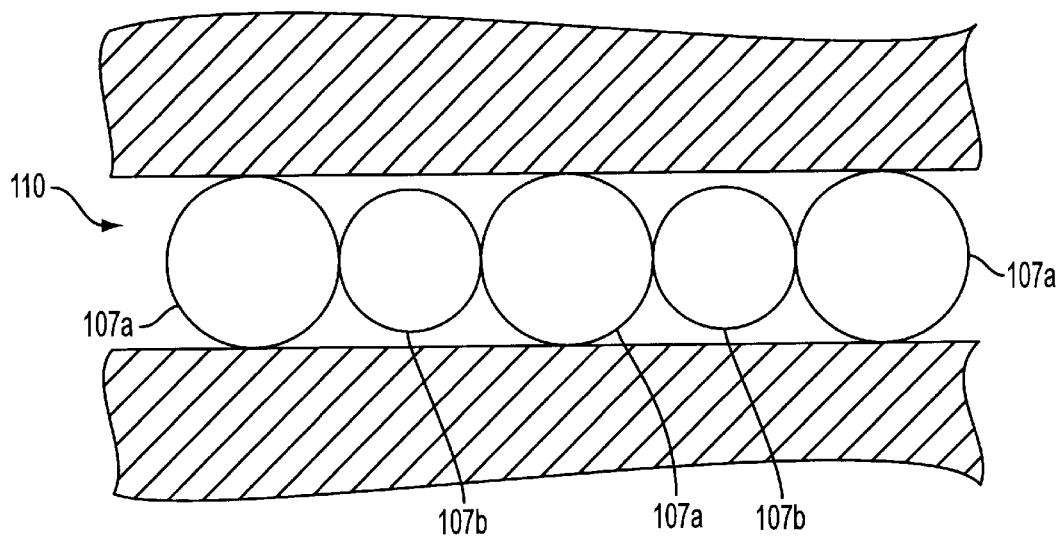

The invention is explained in further detail with the aid of the exemplary embodiments, shown schematically in the Figures. Shown are in:

FIG. 1 A linear-movement guide, comprising a carriage and a rail, in a perspective representation;

FIG. 2 A linear-movement guide according to the invention, in a sectional cut along the line II—II;

FIG. 3 A complete roll body circuit for the linear-movement guide shown in FIGS. 1 and 2;

FIG. 4 A partial view according to detail IV—IV in FIG. 3, showing an enlarged view of the deflection region;

FIG. 5 A view of a partial section of a roll body circuit of an embodiment according to the invention, having two different types of roll bodies.

FIG. 1 shows a linear-movement guide with a grooved guide rail 1, on which a carriage 2 is supported and arranged in such a way that it can be displaced longitudinally. As can be seen in FIG. 2 as well, the carriage 2 has an essentially U-shaped cross section and is clamped around the rail 1 with two legs 3a, 3b, which adjoin a center segment. Caps 4a, 4b are attached to the fronts of the carriage, which caps are secured removable on a metal base body 5 of the carriage. One upper side of carriage 2 is provided as mounting surface 9, to which a load to be moved can be attached.

The carriage is supported on side-mounted bearing surfaces 8 of guide rail 1, by way of roll bodies 7 that are arranged in four, respectively closed circuits 6a, 6b, 6c, 6d. The roll bodies 7 in the exemplary embodiment shown are balls, which are composed totally or in part of a ceramic material, namely $Si_4N_3$. The bearing surfaces 8 are grooved, thus creating a line contact between balls and guide rail.

Four cylindrical recesses 10a, 10b, 10c, 10d are inserted into the metal base body 5, the longitudinal axis of which respectively extends parallel to the longitudinal axis of rail 1. Each of these recesses 10a–10d is a component of one of the roll body circuits 6a–6d. The latter respectively comprise guide means for guiding the roll bodies, which means are arranged respectively in a bearing zone 11, a recess 10a–d of a return channel 12 and two deflection channels 13 that respectively connect the ends of the return channels 12 and the bearing zone 11.

FIG. 3 shows that each of the two deflection channels 13 comprises an inside and an outside deflection guide 13a, 13b. The illustration in FIG. 2 shows that retaining means 16 are provided in the bearing zone 11 as guide means, which function on the one hand to guide the balls and, on the other hand, prevent them from falling out of the carriage 2. The inside deflection guides 13a, as well as the guide means for the bearing zone 11, can be "sprayed" directly onto the metal base body 5 of carriage 2 with the aid of an injection-molding technique. The guide means for the return channels can also be sprayed directly onto the base body. However, the guide means for the return channels 12 can also comprise a sleeve-type element, which is produced of plastic with the injection-molding technique outside of the carriage 2 and is then inserted into the respective recess in the carriage.

It has proven sufficient in this case if the guide means for the deflection channels 13, and preferably all guide means, are manufactured from a plastic that differs from that of the remaining guide means. The guide means for the bearing zone 11 and the return channel 12 thus can be manufactured from a homogeneous, thermoplastic plastic that is suitable for the injection-molding technique, namely a POM. In concrete terms, the plastic sold under the trade name Delrin 500 CL by the DuPont Company is used for this.

In contrast, the inside deflection guide was produced by injecting a plastic that is known as Delrin 500 AF and is produced by the same company. This material essentially corresponds to Delrin 500 CL, but contains additional fibers of PTFE, wherein these fibers have the following composition:

| | |
|---|---|
| Fiber length: | 170 μm to 500 μm |
| Fiber thickness: | 20 μm to 40 μm |
| Volume share PTFE in the plastic: | 12% to 15% |

The retaining means 16 can also be "sprayed directly onto" the base body 5 with an injection-molding technique. The metal base body 5 of carriage 2 is positioned for this inside the mold of an injection-molding machine. Following this, cores are inserted into the recesses 10a–10d and the mold is closed. Delrin 500 CL is then sprayed into the bearing zone regions, while Delrin 500 AF is sprayed into the region of the inside deflection guide. Owing to the subsequent cooling of the two plastic materials, these materials bond in the transition regions. Following this, the cores are removed from the carriage, the mold is opened and the carriage is pulled out. Subsequently, the sleeve-shaped elements can be inserted into the respective recesses in the carriage.

With this injection-molding technique, the Delrin 500 AF material was sprayed into the mold at temperatures and pressures that are standard for injection-molding techniques. The cores were removed following a sufficient cooling of the material temperature.

In the exemplary embodiment shown herein, the guide means for the outer deflection guides is also a plastic part produced from Delrin 500 AF. This part is produced in a separate injection-molding operation and is attached to the respective inside guide means by snapping them together. Essentially this component was produced under the same conditions as the previously mentioned internal deflection guides.

Of course, in additional embodiments of the invention all guide means for the carriage can be produced from Delrin 500 AF. It is also possible that guide means other than the illustrated ones are produced outside of the metal base body and are then attached to the base body upon completion. In particular, it is possible to install all guide means on the carriage only after they have been produced. However, in another embodiment according to the invention, it can also be provided that the guide means of the return channels are spayed directly onto the carriage.

FIG. 5 shows another embodiment according to the invention, which can be provided with the previously described guide means. In contrast, the roll bodies 107a, 107b, which are composed of different materials, are alternately arranged in the roll body circuits, of which only sectional views of one return channel of a roll body circuit 110 are shown. The materials should differ, particularly with respect to their hardness. The materials used for the two types of balls, for example, can be ceramic and plastic, particularly POM and/or PTFE. A combination ceramic/steel is conceivable as well.

FIG. 5 demonstrates that the ceramic balls 107a, shown therein, have a larger diameter than the softer plastic balls 107b, which are respectively arranged between two ceramic balls 107a. Above all, this results in the softer balls 107b not being load bearing. The bearing balls 107a in the exemplary embodiment can have a diameter of 6.35 cm, whereas the plastic balls 107b can have a diameter of 6 mm. The resulting ratio of the two diameters can be maintained, even if the bearing balls and their sacrificial balls have different dimensions and are composed of different materials.

As a result of this arrangement, the wear and particularly the tribooxydation of the bearing ceramic balls 107a can be reduced. Since the bearing ceramic balls 107a are harder than the plastic balls 107b that function as "sacrificial balls," most of the wear occurs on the plastic balls 107a, owing to the friction occurring between the balls. This additional reduction in wear of the bearing balls can help increase the service life of bearings according to the invention, which contain no liquid lubricant—or at least almost no liquid lubricant. In addition, this also allows for carriage movements with small lifts, causing particularly heavy wear, without this resulting in excessive wear. The expression "small lifts" in this case is understood to mean carriage lifts that are smaller than the diameter of the bearing balls.

Particularly for an embodiment of this type, guide means for the roll bodies can furthermore be provided with a complete or partial, hard chromium coating with molecular bonding to the carrier material. The thickness of the coating advantageously should be in the range of 1 $\mu$m and 4 $\mu$m, preferably approximately 3 $\mu$m. Coatings of this type have become known, for example, as "Duralloy-matt" (Duralloy® is a registered trademark of the Duralloy AG, H ärkingen, Switzerland), which can be applied with a galvanic process. It is particularly advantageous in this case if the running surfaces of the guide rail are also coated with such a friction-reducing coating. As alternative to a pure chromium coating, it is also possible to use a coating having molecularly bonded chromium (e.g. Duralloy matte) in connection with $MOS_2$ and/or a diamond-like, amorphous carbon coating.

What is claimed is:

1. The use of a heterogeneous plastic with at least two components, wherein the first component contains particles with PTFE, the second component contains a thermoplastic, characterized in that the plastic is used to form a guide means in a roll body circuit for a guide member of a linear movement guide.

2. The use according to claim 1, characterized in that the plastic material with incorporated particles is sprayed onto the metal base body of a guide member with the aid of a plastic injection-molding technique.

3. A guide member for a linear-movement guide, which is arranged on a rail so as to execute movements in longitudinal direction, said guide member having at least one roll body circuit, wherein each roll body circuit comprises a return channel, a bearing zone, as well as two deflection channels that connect the return channel and the bearing zone, each roll body circuit further comprising several roll bodies, wherein the guide member is provided with guide means for guiding the roll bodies in the roll body circuit, said guide means having running surfaces, characterized in that at least some of the guide means comprise a plastic material with at least two components in a region of the running surfaces of the guide means for the roll bodies (7), of which the first component is incorporated into the second component in the form of particles, the first component has a friction coefficient lower than a friction coefficient of the second component, relative to a metal or ceramic friction partner, and the respective guide means are produced by spraying on plastic with an injection-molding technique, at least in the region of the running surfaces.

4. A guide member according to claim 3, characterized in that at least some of the guide means provided with the plastic material are sprayed onto the metal base body (5) of the guide member and are inseparably connected with this base body.

5. A guide member according to claim 3, characterized in that the roll bodies (7) are provided with a ceramic material, at least on the surface.

6. A guide member according to claim 5, wherein said ceramic material is silicon nitride ($Si_3N_4$).

7. A guide member according to claim 3, characterized in that the second component of the plastic material contains a thermoplastic.

8. A guide member according to claim 7, characterized in that the plastic contains poly oxy-methylene.

9. A guide member according to claim 3, characterized in that the first component is composed at least in part of fibers.

10. A guide member according to claim 9, characterized in that the fibers of the first component have a length of 100 $\mu$m to 700 $\mu$m and a width amounting to 10 $\mu$m to 100 $\mu$m.

11. A guide member according to claim 10, wherein said length is 170 $\mu$m to 500 $\mu$m.

12. A guide member according to claim 10, wherein said width is 20 $\mu$m to 40 $\mu$m.

13. A guide member according to claim 3, characterized in that the first component contains a perfluorinated plastic.

14. A guide member according to claim 13, characterized in that the first component contains poly tetrafluoroethylene (PTFE).

15. A guide member according to claim 3, characterized in that the first component amounts to a volume share of 5% to 35% of the total volume of the plastic material.

16. A guide member according to claim 15, wherein said volume share is 12% to 15%.

17. A guide member according to claim 3, characterized in that a lubricant-free circulation of the roll bodies in the roll body circuit is provided.

18. A guide member according to claim 3, characterized in that it is designed as a carriage, having a center section and two legs that respectively adjoin the center section, as a result of which the carriage has an essentially U-shaped form and contains a recess that extends parallel to the intended longitudinal movement axis, and that the carriage is provided with respectively at least one roll-body circuit in the region of the two legs.

19. A guide member for a linear movement guide according to claim 3, wherein roll bodies with differing dimensions and composed of different materials, at least on the surface, are arranged in at least one roll body circuit.

20. A guide member according to the preamble to claim 3, characterized in that a friction-reducing coating is applied to the surfaces of at least some of the guide means.

21. A guide member according to claim 20, characterized in that the coating contains poly tetrafluoroethylene, poly tetrafluoroethylene propylene, perfluoroalkoxy, diamond-like amorphous carbon, chromium and/or $MoS_2$.

22. A linear movement guide with a rail and a guide member that can be displaced in longitudinal direction along the rail, said guide member supporting itself on this rail with roll bodies, which are arranged inside at least one closed roll body circuit, characterized by a guide member according to claim 3 and a rail, having at least one running surface for roll bodies, which surface is provided with a friction-reducing coating.

23. A guide member according to claim 22, wherein said coating is chromium.

24. A roll body circuit for a linear movement guide that is provided with roll bodies for the circulation, said roll body circuit comprising a return channel, a bearing zone, as well as two deflection channels that connect the return channel and the bearing zone and having guide means for guiding the roll bodies, said guide means having running surfaces, characterized in that at least some of the guide means are provided at least in a region of the running surfaces for the roll bodies with a heterogeneous plastic, having at least two components, and that the first component is embedded in the second component in the form of particles and the first component has a lower friction coefficient than the second component, relative to a metal or ceramic friction partner.

* * * * *